United States Patent
Kawaguchi

(10) Patent No.: US 12,422,018 B2
(45) Date of Patent: Sep. 23, 2025

(54) VIBRATION SUPPRESSION APPARATUS

(71) Applicant: NIHON PLAST CO., LTD., Fujinomiya (JP)

(72) Inventor: Ryo Kawaguchi, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 0 days.

(21) Appl. No.: 18/589,485

(22) Filed: Feb. 28, 2024

(65) Prior Publication Data

US 2024/0295253 A1 Sep. 5, 2024

(30) Foreign Application Priority Data

Mar. 2, 2023 (JP) .................. 2023-032132

(51) Int. Cl.
*B60Q 5/00* (2006.01)
*F16F 15/067* (2006.01)
*B60R 21/203* (2006.01)

(52) U.S. Cl.
CPC .......... *F16F 15/067* (2013.01); *B60R 21/203* (2013.01)

(58) Field of Classification Search
CPC ........ F16F 15/067; F16F 15/08; F16F 15/123; B60R 21/203
See application file for complete search history.

(56) References Cited

U.S. PATENT DOCUMENTS

| | | | | |
|---|---|---|---|---|
| 5,810,535 A | * | 9/1998 | Fleckenstein | ........... F04C 29/12 411/522 |
| 9,855,909 B2 | * | 1/2018 | Ko | ....................... B60R 21/2035 |
| 2021/0031684 A1 | * | 2/2021 | Matsuo | .................... B62D 1/04 |

FOREIGN PATENT DOCUMENTS

JP  2003-154943  5/2003

* cited by examiner

*Primary Examiner* — Amy J. Sterling
(74) *Attorney, Agent, or Firm* — Amin, Turocy & Watson, LLP

(57) ABSTRACT

A vibration suppression apparatus includes housing, and shaft body that is held by housing and sets a movable shaft. Shaft body has a longitudinal shaft body main body portion, and flange portion as a flat portion that protrudes from shaft body main body portion in a direction intersecting a longitudinal direction. Housing has a tubular housing main body portion that includes hole portion, into which shaft body main body portion is inserted, in a central portion, a plurality of claw portions that protrude from one end portion of housing main body portion and have tip end portions formed in a hook shape toward the central portion of housing main body portion to lock flange portion of shaft body, and space portions that are positioned on both sides of claw portions and are formed from an outer surface of housing main body portion toward hole portion.

4 Claims, 4 Drawing Sheets

VIBRATION SUPPRESSION APPARATUS

CROSS REFERENCE TO RELATED APPLICATIONS

This application is entitled to and claims the benefit of Japanese Patent Application No. 2023-032132 filed on Mar. 2, 2023, the disclosure of which including the specification, drawings and abstract is incorporated herein by reference in its entirety.

TECHNICAL FIELD

The present invention relates to a vibration suppression apparatus that elastically supports a second member with respect to a first member.

BACKGROUND ART

In the related art, in relation to a wheel for steering of an automobile, that is, a steering wheel, there is known a damper unit as a vibration suppression apparatus that elastically supports a module such as an airbag apparatus with respect to a core of a steering wheel main body portion and uses the module as a damper mass to suppress vibration of the steering wheel during traveling. A pin as a shaft body that serves as a movable shaft of the damper unit is held in a state of being inserted into an annular housing, and the housing is fixed to the core. In the housing, claw portions that lock and hold a flange portion set in an end portion of the pin are formed (for example, see PTL 1).

CITATION LIST

Patent Literature

PTL 1
  Japanese Patent Application Laid-Open No. 2003-154943 (p. 7, FIGS. 11 and 15)

SUMMARY OF INVENTION

Technical Problem

In such a structure, in attaching the pin to the housing, the pin is inserted from one end portion of the housing and the flange portion is pushed between the claw portions, so that the claw portions are elastically straddled and the flange portion is locked by restoration deformation of the claw portions. In this case, in a case where the thickness of the claw portions is thin, and a portion where a base end portion of the claw portion and a housing main body portion are connected is small in area, there is a concern that strength in straddling the claw portions is insufficient. Accordingly, it is considered to use a material having large rigidity for the housing. In this case, however, because the straddling property of the claw portions is reduced, not only attachment workability is reduced, but also a material cost for reinforcement causes an increase in cost.

The present invention has been made in consideration of such a point, and an object of the present invention is to provide a vibration suppression apparatus in which a shaft body is easily attached to a housing.

Solution to Problem

According to a first aspect of the present invention, there is provided a vibration suppression apparatus that elastically supports a second member with respect to a first member, the vibration suppression apparatus including a housing that is attached to any of a first member side and a second member side, and a shaft body that is held by the housing and sets a movable shaft, in which the shaft body has a longitudinal shaft body main body portion, and a flat portion that protrudes from the shaft body main body portion in a direction intersecting a longitudinal direction, and the housing has a tubular housing main body portion having a hole portion, into which the shaft body main body portion is inserted, in a central portion, a plurality of claw portions that protrude from one end portion of the housing main body portion and have tip end portions formed in a hook shape toward the central portion of the housing main body portion to lock the flat portion of the shaft body, and space portions that are positioned on both sides of the claw portions and are formed from an outer surface of the housing main body portion toward the hole portion.

A vibration suppression apparatus according to a second aspect is the vibration suppression apparatus according to the first aspect, in which wall portions that form a claw portion side of the space portions positioned on both sides of the claw portions are substantially parallel to each other.

A vibration suppression apparatus according to a third aspect is the vibration suppression apparatus according to the first or second aspect, in which the housing main body portion that is connected to base end portions of the claw portions is greater in thickness than the base end portions of the claw portions.

A vibration suppression apparatus according to a fourth aspect is the vibration suppression apparatus according to the first or second aspect, in which the first member is a wheel main body portion, and the second member is a module.

Advantageous Effects of Invention

With the vibration suppression apparatus according to the first aspect, when a plurality of claw portions are straddled in locking the flat portion, a starting point of straddling is set between the space portions of the housing main body portion connected to the base end portions of the claw portions. Accordingly, the shape of the claw portions is difficult to affect the straddling operation of the claw portions, and the straddling property of the claw portion can be improved. Therefore, the shaft body is easily attached to the housing.

With the vibration suppression apparatus according to the second aspect, in addition to the effect of the vibration suppression apparatus according to the first aspect, load can be equally applied to the claw portions. Therefore, the straddling property of the claw portions can be further improved.

With the vibration suppression apparatus according to the third aspect, in addition to the effect of the vibration suppression apparatus according to the first or second aspect, the straddling property of the claw portions can be further improved.

With the vibration suppression apparatus according to the fourth aspect, in addition to the effect of the vibration suppression apparatus according to the first or second aspect, vibration of a wheel, for example, during traveling can be suppressed.

DESCRIPTION OF EMBODIMENTS

Hereinafter, an embodiment of the present invention will be described with reference to the drawings.

Figure 5:
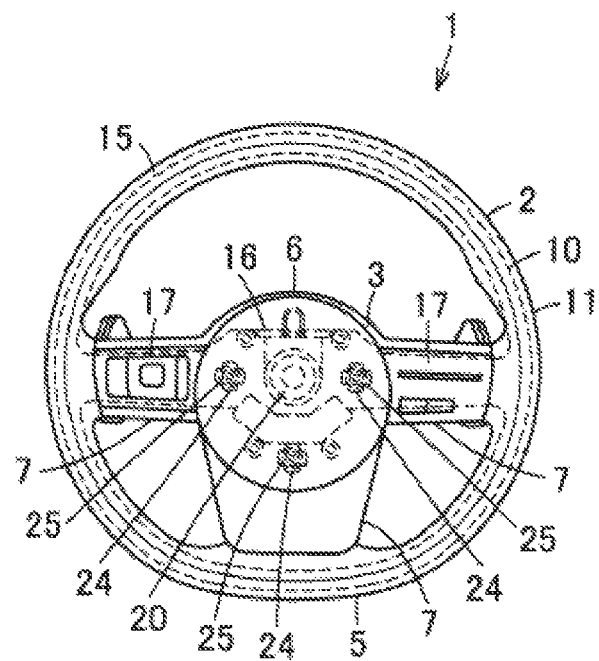
FIG. 5 is a front view showing the wheel described above.

In FIG. 5, reference numeral 1 denotes a steering wheel as a wheel (steering wheel). Steering wheel 1 is disposed in front of an occupant on a driver's seat of a vehicle such as an automobile. Steering wheel 1 includes steering wheel main body portion 2 as a wheel main body portion, module 3 mounted on an occupant side of steering wheel main body portion 2, and the like.

While steering wheel 1 is normally mounted on a steering shaft (not shown) as a steering gear provided in an inclined state, module 3 side is referred to as an occupant side, a front surface side or a rear side and a steering shaft side are referred to as a vehicle body side and a back surface side or a front side, a front-rear direction along the steering shaft is referred to as an axial direction, and directions such as an up-down direction and a right-left direction will be described with a straight direction of a vehicle body in which steering wheel 1 is provided, as a reference. The front surface side is indicated by arrow FR, and the back surface side is indicated by arrow RR.

Steering wheel main body portion 2 has rim portion (ring portion) 5, boss portion (mount portion) 6 that is positioned inside rim portion 5, and a plurality of spoke portions 7 that connect rim portion 5 and boss portion 6.

Rim portion 5 is a part that is gripped and operated by a driver (occupant). At least a part of rim portion 5 is formed in an arc shape. Preferably, rim portion 5 is formed in a ring shape. In the present embodiment, rim portion 5 is formed in an annular shape.

Boss portion 6 is a portion that is connected to the steering shaft. Module 3 is attached to the occupant side of boss portion 6.

In the present embodiment, two spoke portions 7 are formed on right and left sides, and one spoke portion 7 is formed in a lower portion. The present invention is not limited thereto, and two, four, or more spoke portions 7 may be formed.

Steering wheel main body portion 2 includes metallic core 10, soft covering portion 11 that integrally covers a part of core 10, a cover body as a covering member that covers a back surface side of core 10, and the like.

Figure 4:
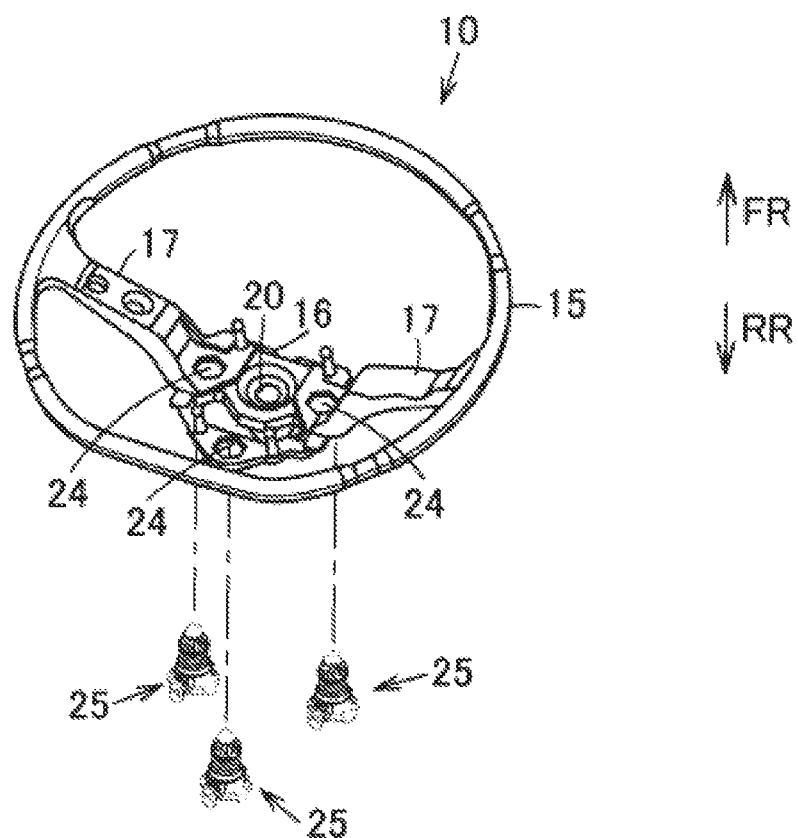
FIG. 4 is an exploded perspective view showing a part of a wheel including the vibration suppression apparatus described above.

Core 10 shown in FIGS. 4 and 5 corresponds to rim portion 5, boss portion 6, and spoke portions 7, includes rim core portion 15, boss core portion 16 as a support portion and spoke core portions 17 as connecting portions, and is formed substantially bilaterally symmetrically as a whole. Rim core portion 15 is integrally connected to boss core portion 16 via spoke core portions 17, and rim core portion 15 and end portions of spoke core portions 17 on rim core portion 15 side are covered with covering portion 11. The surface of covering portion 11, for example, a position of rim portion 5 may be covered with a skin body. The number of spoke core portions 17 needs not always be equal to the number of spoke portions 7, and a part of spoke portions 7 may be formed by a decorative member (finisher) or the like.

Boss core portion 16 integrally has cylindrical boss 20 fitted to the steering shaft in a central portion, and in the present embodiment, spoke core portions 17 are connected to both side portions. In boss core portion 16, attachment portions 24 are formed at positions outward of boss 20. Attachment portions 24 are, for example, circular hole-shaped attachment openings. Vibration suppression apparatuses 25 that elastically support module 3 as a second member with respect to boss core portion 16 of steering wheel main body portion 2 as a first member in a front-rear direction are attached to attachment portions 24. While attachment portions 24 may be disposed at any positions as long as module 3 can be supported by vibration suppression apparatuses 25 in a well-balanced manner, in the present embodiment, attachment portions 24 are disposed on both right and left sides and a lower side of boss 20, that is, at positions corresponding to spoke portions 7. That is, steering wheel 1 is configured such that module 3 is supported by vibration suppression apparatuses 25 at three points around boss 20.

Vibration suppression apparatus 25 is also referred to as a snap-in unit, enables module 3 to be attached to boss core portion 16 of steering wheel main body portion 2 by snap-in engagement, uses module 3 as a damper mass, and configures a dynamic damper that reduces vibration of steering wheel 1 during traveling due to transmission of vibration of an engine, vibration from a road surface, or the like. Vibration suppression apparatus 25 has a function as, for example, a horn spring that holds a horn switch of a horn apparatus set in steering wheel 1 in an open state.

Figure 2:
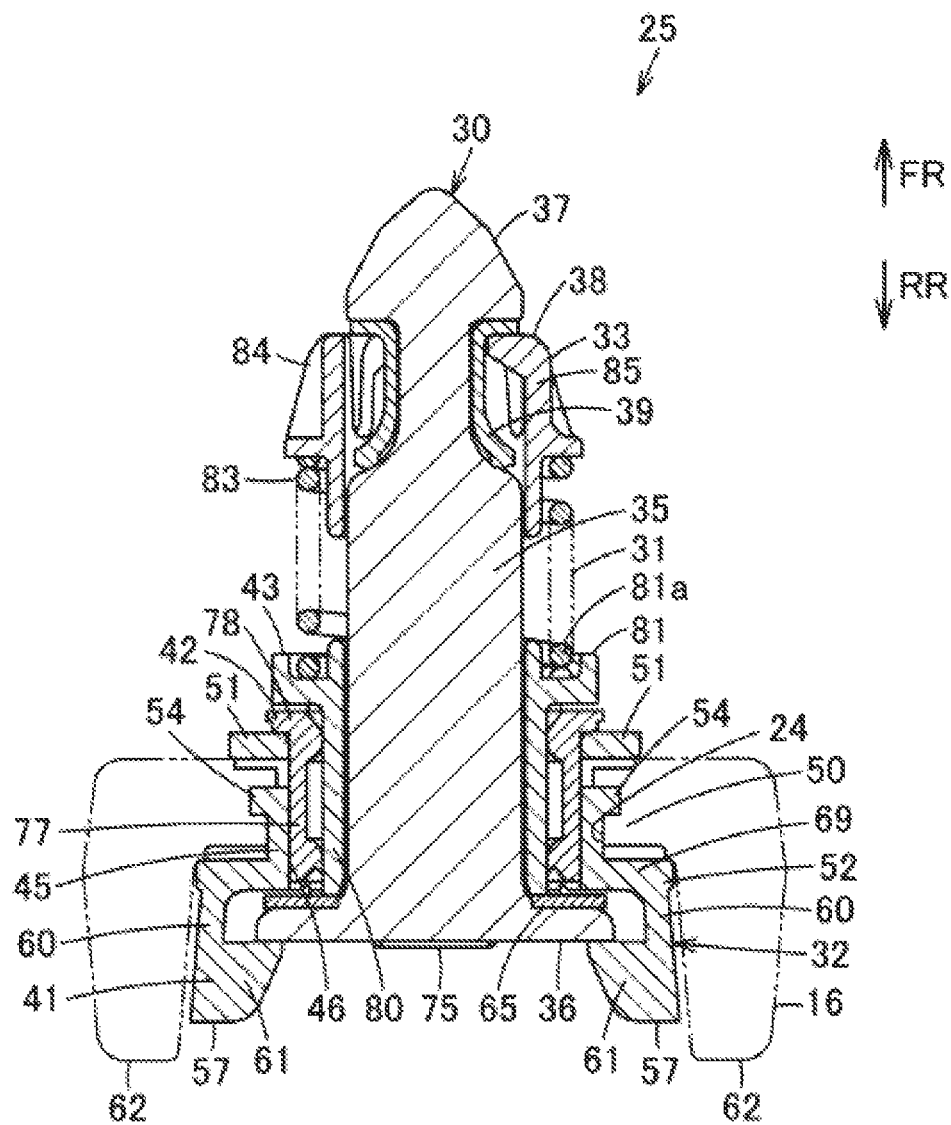
FIG. 2 is a cross-sectional view of the vibration suppression apparatus described above.
Figure 3:
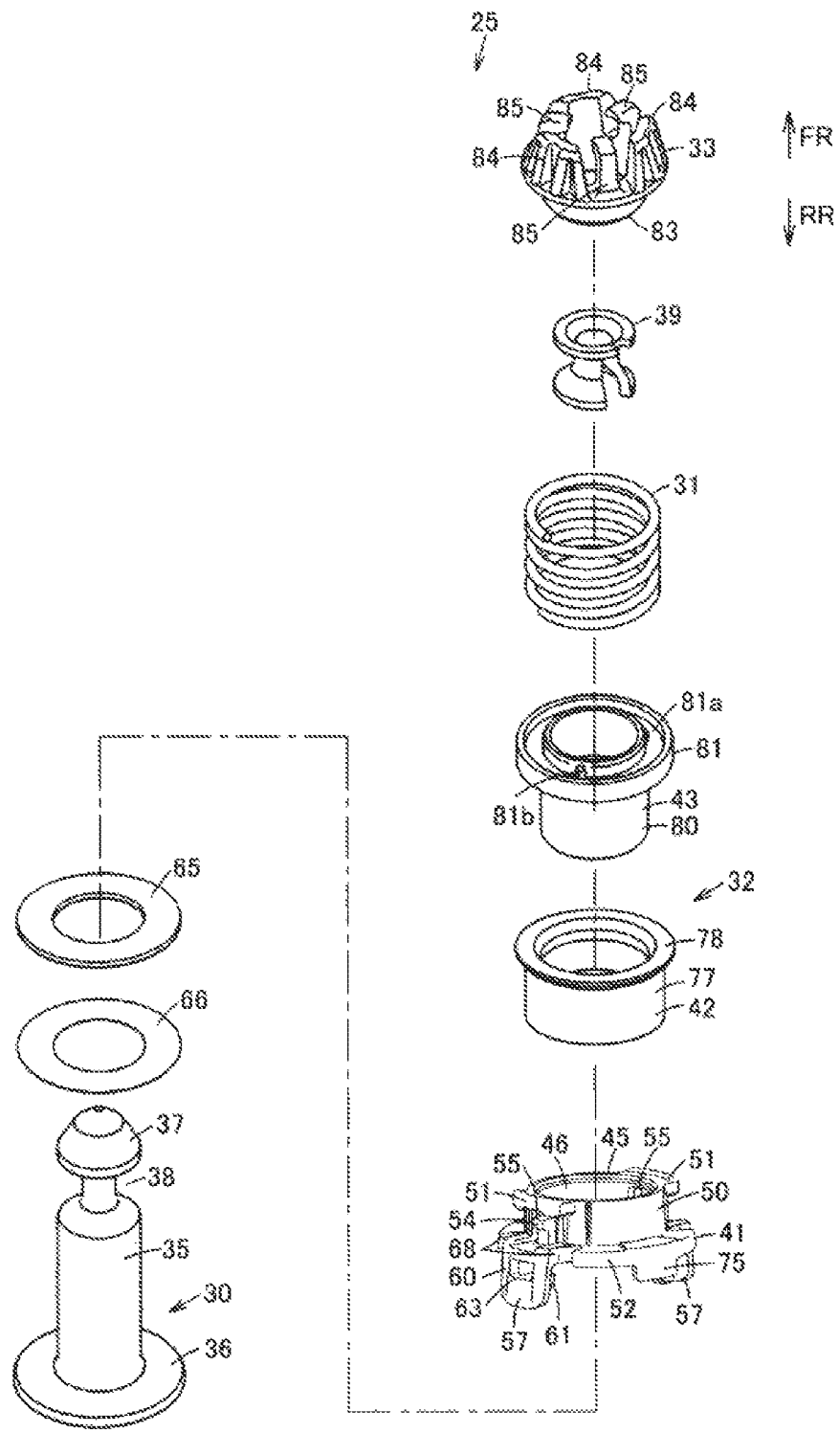
FIG. 3 is an exploded perspective view of the vibration suppression apparatus described above.

As shown in FIGS. 2 and 3, vibration suppression apparatus 25 is schematically configured such that a movable shaft is set by shaft body 30, shaft body 30 is inserted into elastic body 31, and elastic body 31 is sandwiched between first holding portion 32 and second holding portion 33. Then, one of first holding portion 32 and second holding portion 33 is attached to attachment portion (first attachment portion) 24 of steering wheel main body portion 2 (FIG. 5), and the other holding portion is attached to an attachment portion (second attachment portion) of module 3 (FIG. 5). The attachment portion of module 3 (FIG. 5) is, for example, a circular hole-shaped attachment hole. In the present embodiment, an example where first holding portion 32 is attached to attachment portion (first attachment portion) 24 of steering wheel main body portion 2 (FIG. 5), and second holding portion 33 is attached to the attachment portion (second attachment portion) of module 3 (FIG. 5).

Shaft body 30 is also referred to as a pin or the like. Shaft body 30 integrally includes longitudinal shaft body main body portion 35, and flange portion 36 as a flat portion that protrudes in a flange shape in an end portion of shaft body main body portion 35 in an axial direction. Shaft body 30 is formed of, for example, metal. Shaft body 30 is inserted over first holding portion 32, elastic body 31, and second holding portion 33, with flange portion 36 side that is a base end portion as first holding portion 32 side and a tip end portion side as second holding portion 33 side.

Shaft body main body portion 35 is formed in an elongated columnar shape. Shaft body main body portion 35 has a tip end portion having a tapered shape. That is, in the tip end portion of shaft body main body portion 35, reduced diameter portion 37 that is gradually reduced in diameter toward a tip end is formed. In the present embodiment, recessed portion 38 is formed over the entire circumference at a position closer to the tip end portion of shaft body main body portion 35, and in the example shown in the drawing, a position adjacent to a base end portion of reduced diameter portion 37. An engagement member disposed in, for example, the attachment portion of module 3 (FIG. 5) is engaged with recessed portion 38. The engagement member is a member that is referred to as, for example, a snap-in wire and is formed of a wire material such as elastically deformable metal. In the present embodiment, the engagement member is engaged with recessed portion 38, so that vibration suppression apparatus 25 is engaged with the attachment portion of module 3. In the example shown in the drawing, buffer member 39 is attached to recessed portion 38. Buffer member 39 is also referred to as a clip or the like and protects shaft body 30 against the engagement member. Buffer member 39 is formed in, for example, a cylindrical shape and is fitted to recessed portion 38.

Flange portion 36 is a portion that is held by first holding portion 32. Flange portion 36 is formed in a flat plate shape having a diameter greater than shaft body main body portion 35. In the present embodiment, flange portion 36 has a circular shape over the entire circumference of shaft body main body portion 35.

For elastic body 31, for example, a coil spring is used.

First holding portion 32 includes housing 41. In the present embodiment, first holding portion 32 further includes bush 42 and insulator 43, and insulator 43 is attached to housing 41 via bush 42.

Housing 41 shown in FIGS. 1A, 1B, 1C, and 2 is formed of, for example, synthetic resin. Housing 41 has an annular shape disposed substantially coaxially with shaft body 30. Housing 41 has an outer diameter greater than shaft body 30, elastic body 31, second holding portion 33, bush 42, and insulator 43. That is, housing 41 is a member having a maximum diameter in vibration suppression apparatus 25.

Housing 41 has housing main body portion 45 fitted to attachment portion 24. Housing main body portion 45 is formed in a tubular shape, and in the present embodiment, a cylindrical shape. That is, housing main body portion 45 includes hole portion 46, into which shaft body 30 is inserted, in a central portion. Then, housing main body portion 45 integrally includes cylindrical tubular portion 50 that is inserted into attachment portion 24, and locking portions 51 and 52 that protrude in a flange shape from both end portions of tubular portion 50 in the axial direction and are locked to a front surface and a back surface of boss core portion 16, respectively.

In the present embodiment, locking portions 51 are portions that are superposed on the front surface of boss core portion 16. A pair of locking portions 51 is formed on one side and the other side as an opposite side, for example, with a center axis of housing main body portion 45 as a reference. In the example shown in the drawing, pressure contact portions 54 that are brought into pressure contact with an inner edge of attachment portion 24 are formed at positions of respective locking portions 51. Pressure contact portions 54 protrude from locking portion 52 toward locking portions 51 and are formed in a claw shape in which tip end portions protrude in a hook shape. Pressure contact portions 54 are positioned outward with respect to an outer circumferential surface of tubular portion 50, and are elastically movable in a radial direction facing openings 55 for molding of pressure contact portions 54 opened in the outer circumferential surface of tubular portion 50.

In the present embodiment, locking portion 52 is portions that are superposed on the back surface of boss core portion 16. Locking portion 52 is formed in a circular shape over the entire circumference of tubular portion 50, for example. In the example shown in the drawing, locking portion 52 has an amount of protrusion in the radial direction greater than locking portions 51.

In locking portion 52, a plurality of claw portions 57 that lock and hold shaft body 30 are formed. Claw portions 57 are disposed to be positioned one by one on at least one side and an opposite side with a predetermined virtual line passing through the center axis as a reference when viewed from the axial direction of housing main body portion 45. Preferably, claw portions 57 are equally disposed or substantially equally disposed in a circumferential direction of housing main body portion 45. While any number of claw portions 57 equal to or greater than two may be set as long as the number of claw portions are plural, in the present embodiment, two claw portions positioned on opposite sides to each other with the center axis of housing main body portion 45 as a reference are set. Accordingly, claw portions 57 of the present embodiment face each other in the radial direction of housing main body portion 45. In the example shown in the drawing, positions of claw portions 57 correspond to the positions of locking portions 51 and pressure contact portions 54, and are on back surface sides of locking portions 51 and pressure contact portions 54. Claw portions 57 protrude from an end portion on the back surface side as one end portion of housing main body portion 45 in the axial direction.

The tip end portions of claw portions 57 are formed in a hook shape toward the central portion of housing main body portion 45 and lock flange portion 36 of shaft body 30. That is, each of claw portions 57 integrally has leg portion 60 that is connected to locking portion 52, and engagement claw 61 that protrudes from a tip end portion of leg portion 60 toward the central portion of housing main body portion 45.

Base end portions of leg portions 60 are connected near an outer edge portion of locking portion 52. Leg portions 60 are inclined outward of housing main body portion 45 in the radial direction with respect to the outer edge portion of locking portion 52 from a base end portion toward the tip end portion. Leg portions 60 are formed in a plate shape having a width in a circumferential direction of housing main body portion 45 or locking portion 52 and a small length in the radial direction of housing main body portion 45 as a thickness direction. In the example shown in the drawing, a width dimension of leg portions 60, that is, claw portions 57 is substantially equal to a width dimension of locking portions 51. Near the base end portions of leg portions 60, openings 63 for molding of engagement claws 61 are formed to pass through leg portions 60 in the thickness direction. Leg portions 60 face facing portions 62 protruding on the back surface side of boss core portion 16 in a state in which vibration suppression apparatus 25 is attached to attachment portion 24, and outward straddling is regulated.

Engagement claws 61 are formed to have a width dimension smaller than leg portions 60 and are positioned in central portions of the width of leg portions 60. Engagement claws 61 are present outward with respect to hole portion 46 when viewed from the axial direction of housing main body portion 45, and are positioned near an outer edge of hole portion 46. In each of engagement claws 61, a surface on hole portion 46 side, that is, the central portion side of housing main body portion 45 is inclined surface 61a gradually expanded from an end portion closer to the base end portion of leg portion 60 to an end portion on an opposite side. In the present embodiment, engagement claws 61 are engaged with a back surface side of flange portion 36 of shaft body 30 inserted into hole portion 46 of housing main body portion 45 from the back surface side.

In the present embodiment, rubbing prevention member 65 is interposed between locking portion 52 and flange portion 36. In the example shown in the drawing, rubbing prevention member 65 is formed of, for example, nonwoven fabric in an annular shape, and is adhered to flange portion 36 by adhesive member 66 such as a tape.

Each claw portion 57 is set between space portions 68 and 68 formed in locking portion 52. That is, space portions 68 are formed on both sides of claw portion 57. Between space portions 68 and 68, a part of locking portion 52 functions as sliced base portion 69 that is connected to the base end portion of claw portion 57. Base portion 69 has the same or substantially same thickness as locking portion 52, and in the present embodiment, thickness t2 of base portion 69 of housing main body portion 45 connected to the base end portion of claw portion 57, that is, leg portion 60 is set to be larger than thickness t1 of the base end portion of leg portion 60, that is, the base end portion of claw portion 57.

Space portions 68 extend from an outer surface of locking portion 52 toward hole portion 46, that is, inward of housing main body portion 45. The tip end portions of space portions 68 extend near the outer circumferential surface of tubular portion 50. Space portions 68 are recessed spaces that are formed inside notched portions formed in the outer edge portion of locking portion 52. Each of space portions 68 is surrounded by first sidewall portion 71 as a wall portion that forms a side portion of base portion 69 as claw portion 57 side, second sidewall portion 72 as a wall portion that forms a side portion on an opposite side to claw portion 57, and tip end wall portion 73 that connects first sidewall portion 71 and second sidewall portion 72, and an outer edge portion side of locking portion 52 is opened.

First sidewall portion 71 and second sidewall portion 72 may be parallel or substantially parallel to each other or may be inclined to each other. In the present embodiment, first sidewall portion 71 extends along a direction inclined with respect to the radial direction of housing main body portion 45, and second sidewall portion 72 substantially extends along the radial direction of housing main body portion 45. That is, first sidewall portion 71 and second sidewall portion 72 are disposed to be inclined to each other. In the example shown in the drawing, first sidewall portion 71 is parallel or substantially parallel to a protrusion direction of engagement claw 61 from leg portion 60 in claw portion 57. First sidewall portions 71 and 71 that are positioned on both sides of claw portion 57 to form both sides of base portion 69 are parallel or substantially parallel to each other. For this reason, base portion 69 is partitioned in a substantially quadrangular shape when viewed from the axial direction of housing main body portion 45.

Second sidewall portion 72 is inclined to gradually approach first sidewall portion 71 from the outer edge portion of locking portion 52 as the outer edge portion of housing main body portion 45 toward hole portion 46 side, that is, inward of housing main body portion 45. For this reason, space portions 68 are formed in a substantially V shape such that the width is gradually narrowed toward hole portion 46.

Tip end wall portion 73 is formed in an arc shape and smoothly connects first sidewall portion 71 and second sidewall portion 72.

In the present embodiment, in addition to claw portions 57, regulation portions 75 are formed in locking portion 52. Regulation portions 75 are portions that regulate the position of flange portion 36 of shaft body 30 held between claw portions 57. Regulation portions 75 protrude from the end portion on the back surface side as one end portion of housing main body portion 45 in the axial direction with respect to locking portion 52 like claw portions 57. In the example shown in the drawing, regulation portions 75 are formed in a rib shape along the circumferential direction of housing main body portion 45 in the outer edge portion of locking portion 52. Regulation portions 75 are set between claw portions 57 in the circumferential direction of housing main body portion 45. That is, regulation portions 75 are positioned outside base portion 69. In the present embodiment, when viewed from the axial direction of housing main body portion 45, two regulation portions 75 are formed to face a direction perpendicular or substantially perpendicular to a direction in which claw portions 57 and 57 face each other. For example, a protrusion height of regulation portion 75 from locking portion 52 is equal to or greater than a height from locking portion 52 to engagement claw 61 of claw portion 57.

Bush 42 shown in FIGS. 2 and 3 is an attachment seat of insulator 43 to housing 41. Bush 42 is formed of, for example, synthetic resin. Bush 42 has tubular, for example, cylindrical bush main body portion 77, and flange portion 78 that protrudes to an end portion of bush main body portion 77. Bush main body portion 77 is inserted into hole portion 46 of housing main body portion 45 from a front end portion side as the other end portion of housing main body portion 45 in the axial direction. Flange portion 78 extends over the entire circumference of bush main body portion 77. Flange portion 78 is superposed on tubular portion 50 or locking portions 51 of housing main body portion 45 in a state in which bush main body portion 77 is inserted into hole portion 46.

Insulator 43 is a member that directly receives an end portion of elastic body 31, and is a member that assists shaft movability of shaft body 30. Insulator 43 is formed of, for example, synthetic resin. Insulator 43 has tubular, for example, cylindrical insulator main body portion 80, and elastic body receiving portion 81 that protrudes to an end portion of insulator main body portion 80. Insulator main body portion 80 is inserted into bush main body portion 77 of bush 42 from a front end portion side, that is, an opposite side to housing 41. Elastic body receiving portion 81 protrudes in a flange shape from insulator main body portion 80. Elastic body receiving portion 81 extends over the entire circumference of insulator main body portion 80. In elastic body receiving portion 81, groove portion 81a into which the end portion of elastic body 31 is fitted is formed. Inside groove portion 81a, holding portion 81b that holds the end portion of elastic body 31 is formed. Elastic body receiving portion 81 is superposed on flange portion 78 in a state in which insulator main body portion 80 is inserted into bush main body portion 77 of bush 42.

Second holding portion 33 is also referred to as a collar or the like. Second holding portion 33 is integrally fixed to the attachment portion of module 3 (FIG. 5), thereby setting relative positions of steering wheel main body portion 2 (FIG. 5) and module 3 (FIG. 5). Second holding portion 33 is formed of, for example, synthetic resin. Second holding portion 33 is formed in a tubular shape, for example, a cylindrical shape. In a rear end portion as one end portion of second holding portion 33, insertion portion 83 that is inserted into the other end portion of elastic body 31 is formed. In a front end portion as the other end portion of second holding portion 33, fitting portions 84 that fit second holding portion 33 to the attachment portion of module 3 (FIG. 5) are formed. In the present embodiment, fitting portions 84 are a plurality of ribs formed in a circumferential direction of second holding portion 33. Fitting portions 84 are inclined to approach a center axis of second holding portion 33 from a base end portion to a tip end portion. For this reason, the outer circumference of second holding portion 33 is gradually reduced in diameter from a base end portion to a tip end portion. Regulation ribs 85 that come into contact with recessed portion 38 or buffer member 39 of shaft body 30 inserted into second holding portion 33 to regulate a position in the radial direction are formed between fitting portions 84. Regulation ribs 85 are formed in a claw shape in which a tip end portion protrudes in a hook shape, and is elastically deformable in the radial direction with a base end portion as a starting point.

Then, in assembling vibration suppression apparatus 25, first, bush main body portion 77 of bush 42 is inserted into hole portion 46 of housing main body portion 45 of housing 41 formed in advance, insulator main body portion 80 of insulator 43 is inserted into bush main body portion 77, and housing 41, bush 42, and insulator 43 are superposed in the axial direction to compose first holding portion 32.

Next, shaft body 30, or more specifically shaft body main body portion 35 of shaft body 30 with rubbing prevention member 65 adhered to flange portion 36 by adhesive member 66 in advance, is pushed to first holding portion 32 from the back surface side of housing 41 while inserting reduced diameter portion 37 side into hole portion 46 of housing main body portion 45.

Figure 1A:
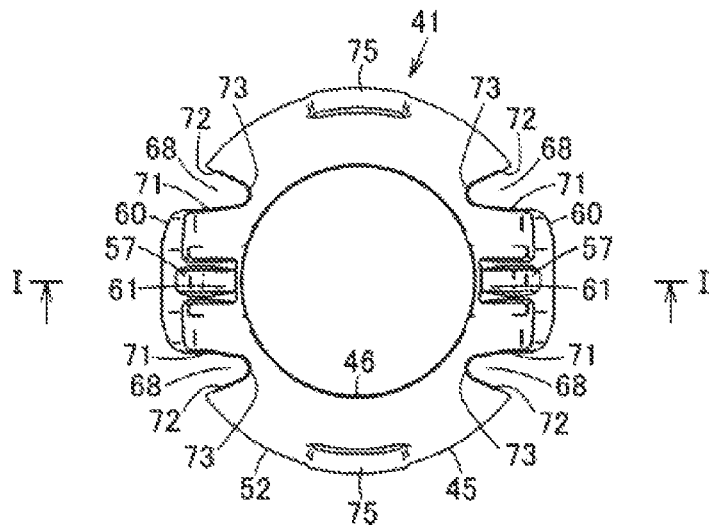
FIG. 1A shows a housing of a vibration suppression apparatus of an embodiment of the present invention and is a rear view of the housing.
Figure 1B:
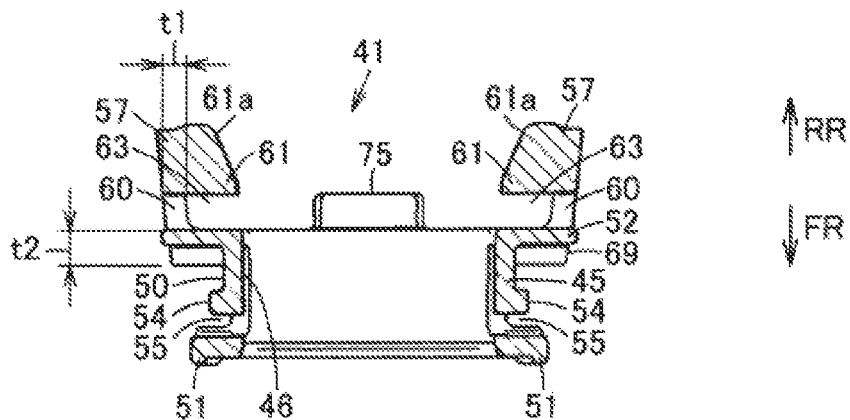
FIG. 1B shows the housing of the vibration suppression apparatus of the embodiment of the present invention and is a cross-sectional view of a position corresponding to I-I of FIG. 1A.
Figure 1C:
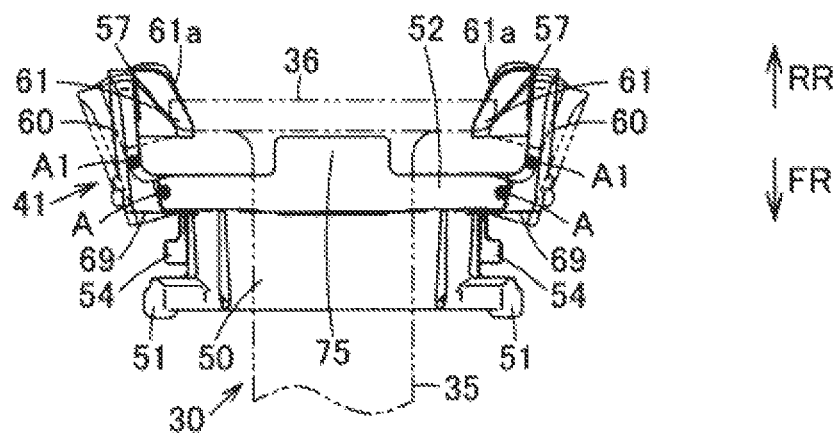
FIG. 1C shows the housing of the vibration suppression apparatus of the embodiment of the present invention and is a side view of the housing.

In this case, as shown in FIG. 1C, flange portion 36 of shaft body 30 is brought into contact with inclined surfaces 61a of engagement claws 61 of claw portions 57 of housing 41. From this state, in a case where shaft body 30 is further pushed, as flange portion 36 presses and expands engagement claws 61, claw portions 57 are straddled outward to rotationally move with positions between the tip end portions of space portions 68 and 68 on both sides of base portions 69, for example, positions near tubular portion 50 as starting points A. Accordingly, flange portion 36 is guided along inclined surfaces 61a of engagement claws 61, and claw portions 57 are restored and rotationally moved from starting points A and straddled at positions beyond engagement claws 61, so that engagement claws 61 are engaged with the back surface side of flange portion 36 and press down shaft body 30. As a result, shaft body 30 is held by first holding portion 32.

Next, elastic body 31 is attached to insert shaft body main body portion 35 of shaft body 30 protruding from insulator 43 shown in FIGS. 2 and 3, and one end portion of elastic body 31 is inserted into groove portion 81a of elastic body receiving portion 81 of insulator 43 of first holding portion 32 to bring holding portion 81b into pressure contact with an inner circumference side, so that one end portion of elastic body 31 is held by first holding portion 32. Second holding portion 33 is pressed into shaft body main body portion 35 of shaft body 30.

In this case, reduced diameter portion 37 of shaft body 30 is brought into contact with the tip end portions of regulation ribs 85 of second holding portion 33. Second holding portion 33 is further pushed from this state, so that regulation ribs 85 are straddled outward with the base end portions as starting points as reduced diameter portion 37 of shaft body 30 gradually presses and expands regulation ribs 85. Then, regulation ribs 85 are restored and rotationally moved from the starting points and straddled at the positions where reduced diameter portion 37 is beyond the tip end portions of regulation ribs 85, so that regulation ribs 85 are fitted into the position of recessed portion 38. Then, second holding portion 33 is fitted to elastic body 31 by inserting insertion portion 83 into the other end portion of elastic body 31.

Vibration suppression apparatus 25 assembled in this way is inserted and attached to attachment portion 24 of core 10 of steering wheel main body portion 2 from the back surface side. In this case, second holding portion 33, elastic body 31, shaft body main body portion 35 of shaft body 30, and bush 42 and insulator 43 of first holding portion 32 protrude from attachment portion 24 to the front surface side of core 10, and housing 41 is fitted to attachment portion 24. Housing 41 is pressed into attachment portion 24, so that locking portions 51 of housing main body portion 45 strongly interfere with the front surface of core 10, and locking portion 52 strongly interferes with the back surface of core 10. Moreover, pressure contact portions 54 are brought into pressure contact with the inner surface of attachment portion 24, so that housing 41 is firmly fitted to and held by attachment portion 24.

Then, in attaching module 3 to steering wheel main body portion 2, in a case where the attachment portion of module 3 is positioned with respect to second holding portion 33 of vibration suppression apparatus 25 and is pushed from the front surface side, fitting portions 84 of second holding portion 33 are inserted into the attachment portion. In a case where module 3 is further pushed from this state, the back surface of reduced diameter portion 37 of shaft body 30 relatively protruding from second holding portion 33 is engaged with the engagement member disposed in the attachment portion of module 3, so that module 3 is attached to core 10 of steering wheel main body portion 2 by snap-in engagement. In this state, shaft body 30 is reliably not slipped off in the front surface direction by the engagement member, and module 3 is prevented from being unexpectedly separated from steering wheel main body portion 2. Elastic body 31 elastically supports module 3.

Accordingly, vibration suppression apparatus 25 acts as a damper with shaft body 30 as a movable shaft, so that module 3 acts as a damper mass and vibration of steering wheel 1 during traveling is suppressed. That is, in a case where vibration in a direction intersecting (perpendicular to) the axial direction of shaft body 30 is input to steering wheel 1, elastic body 31 is elastically deformed in the radial direction, so that module 3 vibrates in a direction intersecting (perpendicular to) the axial direction at a low resonance frequency. In a case where vibration in the axial direction of shaft body 30 is input to steering wheel 1, elastic body 31 is elastically deformed in the axial direction, so that module 3 vibrates in the axial direction at a low resonance frequency. Therefore, module 3 resonates to function as a damper mass of a dynamic damper with respect to vibration in the directions perpendicular to each other, and vibration of steering wheel 1, that is, vibration of the hands of the driver who grips steering wheel 1 is suppressed, thereby suppressing discomfort due to the vibration.

As described above, according to one embodiment, a plurality of claw portions 57 that lock flange portion 36 of shaft body 30 are set in housing main body portion 45 of housing 41, and space portions 68 from the outer surface of housing main body portion 45 toward hole portion 46 are set on both sides of claw portions 57. Accordingly, in a case where a plurality of claw portions 57 are straddled in locking flange portion 36, starting points A of the straddling are set between space portions 68 and 68 of housing main body portion 45 connected to the base end portions of claw portions 57. For this reason, compared to a configuration in which, like the claw portions of the related art, the claw portions are straddled with positions connected to the base end portions of leg portions 60, that is, locking portion 52 as starting points A1, the shape such as a cross-sectional area or a surface area of claw portions 57 themselves is difficult to affect the straddling operation of claw portions 57. Moreover, a distance from starting point A to engagement claw 61 of the tip end portion of claw portion 57 is made large, so that claw portions 57 can be operated largely, the straddling property of claw portions 57 can be improved, and shaft body 30 is easily attached to housing 41.

Even though the material rigidity of housing 41 is improved or an amount of protrusion of claw portions 57 from leg portions 60 of engagement claws 61, that is, an amount of engagement with flange portion 36 is made large, the straddling property of claw portions 57 is satisfactory. Accordingly, attachment workability is not reduced, the strength of housing 41 is secured, and shaft body 30 can be firmly held by housing 41.

Because claw portions 57 are straddled with starting points A in base portions 69 that are connected to the base end portion of leg portions 60 and have a thickness thicker than leg portions 60, the straddling property of claw portions 57 can be further improved.

In addition, because first sidewall portions 71 that form claw portion 57 side of space portions 68 positioned on both sides of claw portions 57 are substantially parallel to each other, load can be equally applied to claw portions 57 in pushing flange portion 36 of shaft body 30, so that the straddling property of claw portions 57 can be further improved.

In this case, there is no need to use a material having high strength for housing 41, and the straddling property is improved, so that improvement of assembling workability of vibration suppression apparatus 25 can be achieved.

In addition, for starting points A1 of the related art, an escape place of load applied to the claw portions concentrates on the base end portions of the claw portions having a small surface area, and the straddling property of the claw portions is not satisfactory. In contrast, in the present embodiment, because starting points A are set near hole portion 46 (tubular portion 50) of housing main body portion 45 having a wide area, load is easily distributed, and the straddling property of claw portions 57 is expected to be improved.

Then, because vibration suppression apparatus 25 elastically supports module 3 with respect to steering wheel main body portion 2, vibration of steering wheel 1, for example, during traveling can be suppressed.

In one embodiment, space portions 68 may have a recessed shape, and may be formed in, for example, a substantially U shape or a substantially recessed shape.

Space portions 68 need not always be provided near tubular portion 50 of housing main body portion 45 as long as space portions 68 are formed from both sides of claw portions 57 toward hole portion 46.

INDUSTRIAL APPLICABILITY

The present invention is suitably used to suppress vibration of a steering wheel of a vehicle such as an automobile during traveling.

REFERENCE SIGNS LIST 2 steering wheel main body portion as wheel main body portion that is first member
3 module that is second member
25 vibration suppression apparatus
30 shaft body
35 shaft body main body portion
36 flange portion that is flat portion
41 housing
45 housing main body portion
46 hole portion
57 claw portion
68 space portion
71 first sidewall portion that is wall portion

What is claimed is:

1. A vibration suppression apparatus that elastically supports a second member with respect to a first member, the vibration suppression apparatus comprising:
a housing that is attached to any of a first member side and a second member side; and
a shaft body that is held by the housing and sets a movable shaft,
wherein the shaft body has
a longitudinal shaft body main body portion,
a flat portion that protrudes from the shaft body main body portion in a direction intersecting a longitudinal direction, and
the housing has
a tubular housing main body portion having a hole portion, into which the shaft body main body portion is inserted, in a central portion,
a plurality of claw portions that protrude from one end portion of the housing main body portion and have tip end portions formed in a hook shape toward the central portion of the housing main body portion to engage with the back surface side of the flat portion of the shaft body, and
space portions that are positioned on both sides of the claw portions and are formed from an outer surface of the housing main body portion toward the hole portion.

2. The vibration suppression apparatus according to claim 1,
wherein wall portions that form a claw portion side of the space portions positioned on both sides of the claw portions are substantially parallel to each other.

3. The vibration suppression apparatus according to claim 1,
wherein the housing main body portion that is connected to base end portions of the claw portions is greater in thickness than the base end portions of the claw portions.

4. The vibration suppression apparatus according to claim 1,
wherein the first member is a wheel main body portion, and the second member is a module.

* * * * *